Feb. 12, 1952 N. A. GUSSACK Re. 23,461

GUIDE FOR DRAWERS OR SHELVES

Original Filed May 5, 1947 2 SHEETS—SHEET 1

INVENTOR.
Nathan A. Gussack
BY
Mock & Blum
ATTORNEYS

GUIDE FOR DRAWERS OR SHELVES
Original Filed May 5, 1947 2 SHEETS—SHEET 2
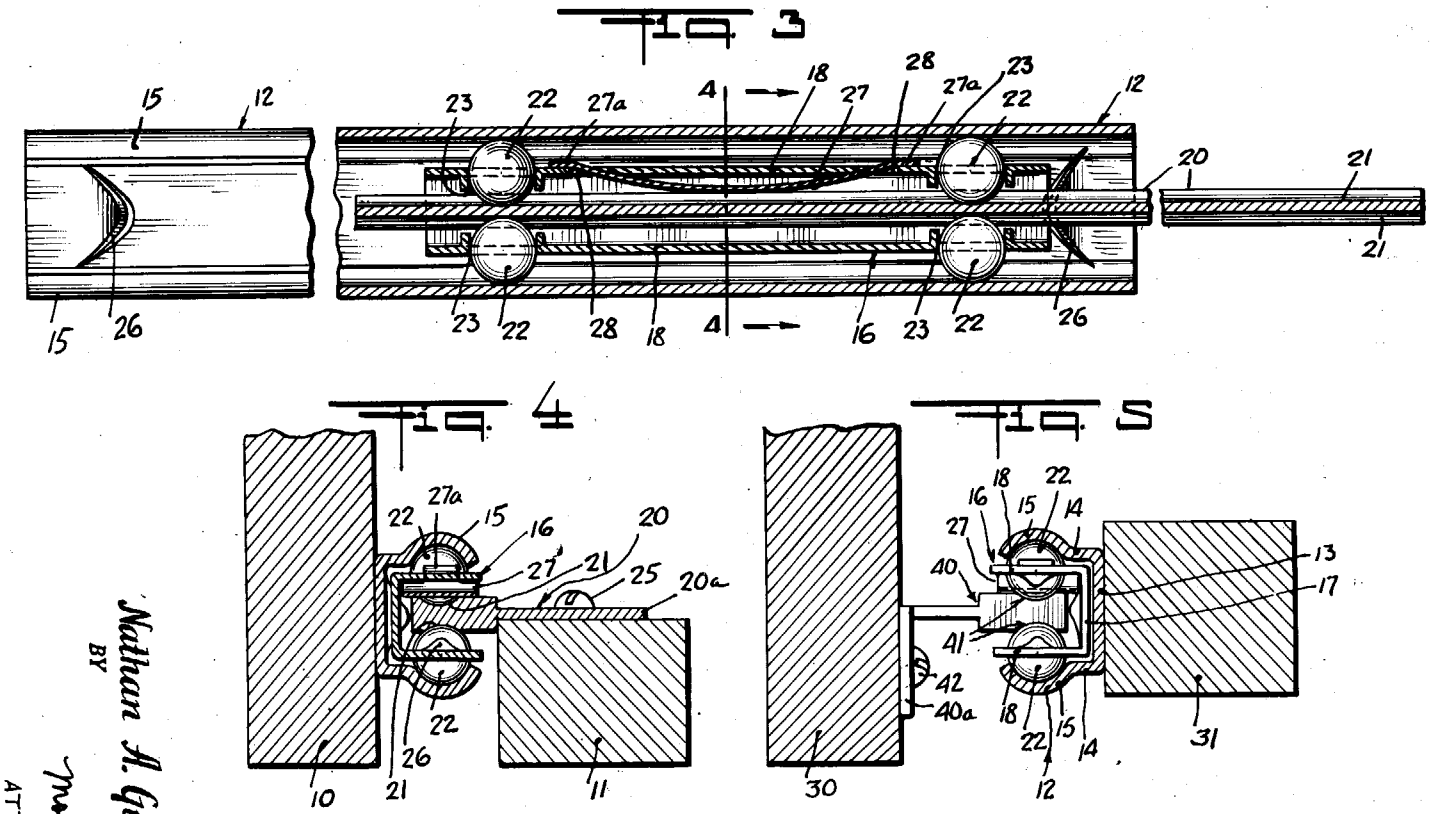
INVENTOR.
Nathan A. Gussack
BY
Mocker & Blum
ATTORNEYS Reissued Feb. 12, 1952 Re. 23,461

UNITED STATES PATENT OFFICE 23,461

GUIDE FOR DRAWERS OR SHELVES

Nathan A. Gussack, New York, N. Y., assignor to Grant Pulley & Hardware Co., Flushing, N. Y., a firm Original No. 2,534,350, dated December 19,1950, Serial No. 746,000, May 5, 1947. Application for reissue May 15, 1951, Serial No. 226,501

4 Claims. (Cl. 308—3.8)

Matter enclosed in heavy brackets [ ] appears in the original patent but forms no part of this reissue specification; matter printed in italics indicates the additions made by reissue.

This invention relates to a new and improved slide support means for slidable drawers, shelves or the like in cabinets, desks and other articles.

It is an object of the invention to provide an improved slide support on which drawers or shelves may be mounted within a supporting frame or cabinet and which will allow opening and closing of said drawers or shelves with a minimum of friction and with a minimum expenditure of effort by the user.

Another object of the invention is the provision of a slide support of the character indicated which will be durable and efficient in operation, which may be constructed from a minimum number of parts and which can be fabricated and assembled easily and economically.

The invention is of particular utility in providing a slidable support in a cabinet, for the turntable of a player for phonograph records. When such support is slid out of the cabinet to expose the turntable, the support must be mounted on the cabinet without any relative movement or play, or else the phonograph record will deliver a disagreeable rattling sound when it is played. In some cases, the record is played while the slidable support for the turntable is in its closed position, so that rattling must be prevented in the open and closed position of the drawer or slidable support.

The foregoing objects as well as additional objects and advantages of the invention will be readily understood in the course of the following description taken in connection with the accompanying drawings which illustrate preferred embodiments of the invention, and wherein:

Fig. 3 is a sectional view of one of the slide supports taken on line 3—3 of Fig. 2;

Fig. 4 is a sectional view taken on line 4—4 of Fig. 3. As in Fig. 1, this view also shows a portion of the drawer and of the supporting frame in which the drawer is slidably mounted; and Fig. 5 is a view of a slightly modified form of slide support and illustrates a different manner of mounting a drawer thereon.

Figure 1:
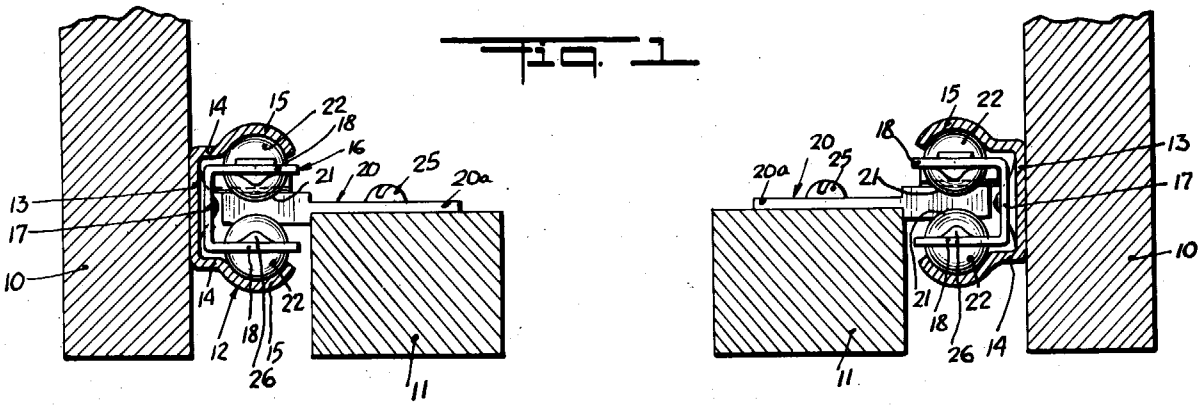
Fig. 1 is a transverse sectional view illustrating a drawer mounted within a frame or cabinet on a pair of slide supports embodying the features of the invention. Only a portion of the vertical side walls of the drawer and a portion of the supporting frame are shown to illustrate one method of mounting the drawer on the slide support.

Referring first to Fig. 1, the drawer is illustrated as having vertical side walls 10 which depend below its bottom wall (not shown) and the drawer is slidably mounted within a frame including longitudinal frame supports 11.

An elongated channel member 12 having a side wall 13 integral with top and bottom walls 14 may be fastened to each of the side walls 10 of the drawer preferably, by means of screws located in countersunk holes (not shown) in said side walls. Top and bottom walls 14 are provided with longitudinal grooves or recesses 15, which serve as ball-races. A ball-retainer 16 of U-shaped cross-section is slidably mounted within channel member 12, in a manner to be more fully described hereinafter, with its side wall 17 adjacent side wall 13 of channel member 12, and with its horizontal ball-retaining walls 18 respectively adjacent top and bottom walls 14 and ball-races 15 of said channel member 13.

A flat, elongated track 20 is slidably mounted within the ball-retainer 16 in a manner to be fully described. Track 20 is provided on its upper and lower surfaces, adjacent one of its longitudinal edges, with longitudinal grooves or recesses 21 which serves as ball-tracks. The ball-retaining walls 18 are provided with a respective longitudinal series of pockets 23. Balls 22 are located turnably in said pockets 23, so that each ball 22 can turn in all directions in its pocket 23.

Figure 2:
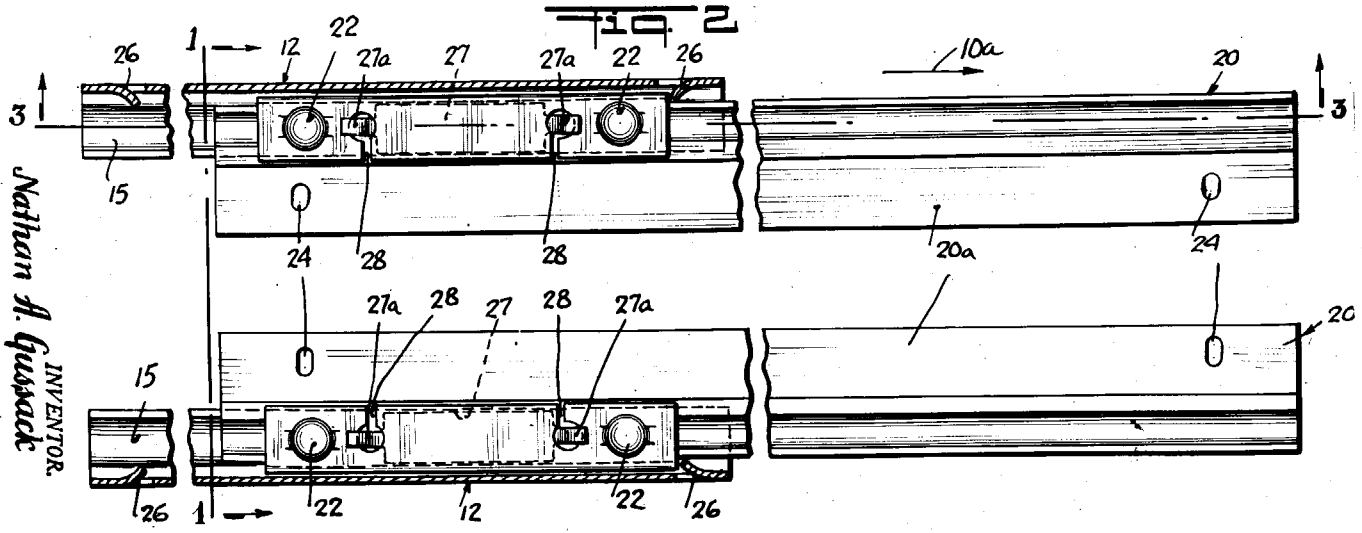
Fig. 2 is a plan view partly in section of the pair of slide supports of Fig. 1 illustrating the relationship and cooperation between the channel member, the slidable carriage mounted thereon and the slidable track mounted within the carriage.

Each track 20 is provided with a mount portion 20a, which is fixed adjustably to the respective frame-member 11, in order to permit full lateral adjustment. For this purpose, and as shown in Fig. 2, the mount portions 20a are provided with transversely elongated holes 24, of elliptical or other elongated shape. These holes 24 are arranged in transversely aligned pairs. The fastening and clamping screws 25 have shanks which pass through the holes 24 and enter the frame-members 11. As measured transversely, the shank of each screw 25 is of less width than the holes 24, so that the tracks 20 can be laterally adjusted at each side relative to the frame-members 12, before tightening the clamping screws 25 to final position.

When thus adjusted, the ball-tracks 21 are accurately laterally positioned relative to the balls 22, so that the drawer 10 can be moved longitudinally back and forth, without any binding of the balls in the ball-races 15 or in the ball-tracks 21, because each ball-track 21 is accurately vertically aligned with the respective ball-race 15.

Each channel member 12 may be provided with longitudinally spaced stops 26 for limiting the forward and rearward movement of its ball-retainer 16 and its track 20. Said stops 26 may be formed integrally with and struck inwardly from the side wall 13 of said channel member 12 adjacent each end thereof, or may be formed in any other suitable manner. For example, either one or both stops 26 need not be integral with channel member 12, but might take the form of a headed screw or stud or other separable element securable to said channel member 12 after assembly therewith of ball-retainer 16 and slidable track 20. The arrow 10a shows the direction of forward movement of the drawer 10 and its fixed tracks 20, when the drawer is pulled forwardly relative to the frame, in order to open the drawer. If it is desired to completely remove the drawer 10 from frame 11, the integral stops 26 must be replaced by removable stops. It is sufficient to provide a rear removable stop, and to provide a frame from which the drawer can be slid rearwardly.

In order to prevent the drawer from rattling either in its closed or open position, spring means are employed for tensioning each track 20 within its ball-race 16. A convenient arrangement for accomplishing this anti-rattle effect is the use of a blade-spring 27 having reduced end-lugs 27a, each of which is inserted into and passed through a slot 28 extending inwardly from the free edge of either the top or the bottom wall 18 of ball-race 16. The inner end of each slot 28 is preferably enlarged, as best shown in Fig. 2, to properly receive and retain the end-lug 27a of spring 27. Each spring 27 is made of any suitable resilient material and it is of sufficient length to press against and tension its track 20 when said track 20 is inserted within its ball-race 16.

It is not necessary to provide a ball-retainer 16 with more than one tensioning spring 27, but I can optionally provide the top wall and also the bottom wall 18 of each ball-retainer 16 with a spring 27.

Each ball-retainer 16 is assembled with its tensioning spring or springs 27, as a sub-unit, before assembling the ball-retainer 16 with the other parts. Each spring 27 has a normal flat shape, and each spring 27 is bent into arched shape, as shown in Fig. 3, when it is assembled with the respective wall 18. This arched shape of each spring 27 is produced and maintained because the distance between each pair of slots or recesses 28 is less than the normal flat length of spring 27.

The effect of the arching of each spring 27 is to force the slots 28 away from each other, thus subjecting each ball-retainer 16 to longitudinal tension between its pair or pairs of slots 28. The drawings are substantially to scale and reference is made thereto for further disclosure. The ball-retainers 16 are made of thin metal, as cold-rolled steel which has a thickness of about 0.050 inch. In addition to the tension effect, each arched spring 27 exerts a bending or arching effect upon the respective ball-retaining wall 18. As shown in Fig. 3, I use two balls 22 in each ball-retaining wall 18, so that each ball-retainer 16 has four balls 22. As also shown in Fig. 3, the two ball-receiving pockets 23 are close to the respective slots 28. Hence, the bending or arching effect upon the top wall 18 shown in Fig. 3, is to force the two top balls 22 against the track 20.

If I use an arched spring 27 with a bottom ball-retaining wall 18, such bottom ball-retaining wall 18 is arched upwardly, thus also forcing its two balls 22 against the track 20.

When the ball-retainers are assembled with the springs 27, and the other parts are assembled as shown in Fig. 1, the balls 22 fit accurately in the ball-races 15, while said balls 22 are thus pressed against the ball-tracks 21. Hence the drawer 10 cannot move up or down relative to the frame 11, either in open or closed position of the drawer.

If desired, there may be a resilient pressure of the ball-races 15 upon the balls 22, when the device is assembled.

The manner of mounting a slidable drawer 10 within a frame or cabinet upon the slide support 11 illustrated in Figs. 1–4 will depend, of course, upon the particular construction and interrelationship of the drawer 10 and frame or cabinet. Where the drawer has vertical side walls depending below a bottom wall and the frame has horizontal longitudinal supports 11 situated below said bottom wall of the drawer, channel members 12 may be secured to the inner sides of said vertical walls 10 and tracks 20 may be secured to said longitudinal frame supports 11, as indicated in Figs. 1 and 4. In this case each track 20 will be stationary and each channel member 12 and each ball-retainer 16 will be slidable on its track 20 as the drawer is opened and closed. The above arrangement may be reversed where the vertical side walls of the drawer are spaced inwardly from the side walls of the frame to provide a transverse space therebetween and where the vertical side walls of the drawer do not depend below, but terminate at, the bottom wall of said drawer. Here each slide support 11 may be located at a proper level within the space between the side wall of the frame and the side wall of the drawer, with each channel member 12 secured to the side wall of the fixed frame and each track 20 secured to the bottom wall of the drawer. In the latter case each channel member 12 will be stationary and each ball-retainer 16, together with its track 20 will be slidable when the drawer is opened and closed.

Returning now to the initially described construction of the drawer and frame, a modification of the slide support is illustrated in Fig. 5. Here the drawer has vertical side walls 30, depending below the bottom wall of the drawer and is below the support 31 of the frame. The details of construction of the slide support with respect to channel member 12 and ball-retainer 16 are the same as for the first embodiment and the several parts thereof have been correspondingly numbered in Fig. 5. The slide support has a slidable track 40 mounted within ball-retainer 16 and provided on its upper and lower surfaces adjacent one of its longitudinal edges with longitudinal grooves or recesses 41 which serve as ball-tracks. Track 40 is slidably assembled relative to channel member 12 by means of balls 22 disposed between each pair of aligned ball-races 15 and ball-tracks 41 in said channel member and said track respectively, each of the balls 22 being disposed rotatably within holes in horizontal walls 18 of ball-retainer 16, as in the first embodiment. In the second embodiment, however, track 40 has a mounting flange 40a disposed substantially at right angles to the body of said track 40. The arrangement here described allows the mounting of track 40 on the vertical side wall 30 of the drawer as by means of screws 42 and the mounting of channel member 12 on horizontal fixed frame support 31. In this case channel member 12 will be stationary and ball-retainer 16, together with its track 40, will be slidable as the drawer is opened and closed. As will be readily seen from the foregoing description and by comparing Fig. 5 with Fig. 4, the mounting of the slide support is reversed in the embodiment of Fig. 5, the reversed mounting being effected substantially by the presence of the right-angled mounting flange 40a of track 40 in the latter embodiment. The spring or springs 27 are used in the second embodiment.

It is thus apparent that the invention provides a slide support which by slight modification may be readily adopted for a variety of types of slidable drawer and frame constructions.

Since omissions and additional modifications may be made in the slide support of the invention without departing from the scope thereof, it is intended that all matter contained in the foregoing description and shown in the accompanying drawings be interpreted merely as illustrative and not in a limiting sense.

The component parts of the device may be made from any suitable metal of other material. Channel member 12, ball-race 16 and track 20 or 40 are preferably each of integral construction and can be fabricated by simple stamping, rolling and bending operations.

What is claimed is:

1. A slide support of the character described comprising an elongated channel member having an open side, a side wall and upper and lower horizontal walls integral therewith, said upper and lower walls being provided with opposed longitudinal grooves, a carriage slidably mounted within said channel member, said carriage having an open side, a side wall disposed adjacent said side wall of said channel member, and flexible horizontal walls, a track insertable between said horizontal walls of said carriage and slidable relative to said carriage and said channel member, said track presenting longitudinal grooves on the upper and lower surfaces thereof, said first-mentioned longitudinal grooves and said second-mentioned longitudinal grooves being arranged in respective pairs, said horizontal walls of said carriage having perforations adjacent their ends, balls rotatably disposed between respective pairs of said first-mentioned and second-mentioned grooves, said balls being rotatably and partially disposed within said perforations, one of said horizontal walls of said carriage having a pair of slots extending inwardly from the free edge thereof, said slots being disposed between and adjacent said perforations in said horizontal wall of said carriage, each of said slots having an enlarged base, a tensioning strip-spring interposed between said wall and said track, said strip-spring having end lugs, said end-lugs of said strip-spring being respectively inserted within said slots, said strip-spring being arched against said track, said strip-spring exerting force on the respective segmental portions of said horizontal wall of said carriage between said respective slots and perforations to press said respective segmental portions of said horizontal wall against said balls, said horizontal wall being arched toward the nearer of the horizontal walls of the channel member, said pressure of said respective segmental portions of said horizontal wall of said carriage against said balls pushing said balls against said track, said track having an integral mounting portion extending outwardly from said open side of said channel member for securement to a supporting surface, the side wall of said channel member presenting abutting stops adjacent the ends thereof to limit the forward and rearward movement of said carriage.

2. A slide support of the character described comprising an elongated channel member provided with opposed longitudinal ball-race grooves, a carriage slidably mounted within said channel member, a track insertable within said carriage and slidable relative to said carriage and said channel member, said track having longitudinal ball track grooves on the upper and lower surfaces thereof, and which are aligned with said ball-race grooves, said carriage having longitudinal portions between which said track is located, said carriage portions having ball-receiving perforations therethrough, balls rotatably disposed between respective pairs of said ball-race grooves and ball-track grooves, said balls being rotatably disposed within the perforations of said carriage and abutting said ball-race grooves and said ball-track grooves, one of said longitudinal portions of said carriage having a pair of slots extending inwardly from the free edge thereof, said slots being disposed between said perforations in said longitudinal portion of said carriage, each of said slots having an enlarged base, a tensioning strip-spring interposed between said longitudinal portions and said track, said strip-spring having end-lugs, said end-lugs of said strip-spring being respectively inserted within said slots, said strip-spring being arched against said track, said strip-spring extending force on the respective sub-portions of said horizontal portion between said respective slots and perforations, said strip-spring pressing said sub-portions against said balls, said longitudinal portion of said carriage being arched away from said track, said pressing of said sub-portions against said balls pushing said balls against said track.

3. In a device as described, a track member having a groove therein, a flexible ball-retaining wall member having perforations therein, means for holding said ball-retaining wall in spaced parallel relationship to said track, balls rotatably disposed within said perforations of said ball-retaining member and resting within said groove of said track member, means for limiting the movement of said balls away from said groove, said ball-retaining member having a pair of slots extending inwardly from the free edge thereof and disposed between said perforations in same, a tensioning strip-spring interposed between said ball-retaining member and said track, said strip-spring having end-lugs, said end-lugs being respectively inserted within said slots, said slots being adapted to retain said end-lugs therein, said strip-spring being arched against said track, said strip-spring exerting force on the respective segmental portions of said ball-retaining member between said respective slots and perforations, and pressing said segmental portions against said balls to hold same against said track.

4. *A slide support comprising an elongated channel member provided with opposed longitudinal ball-race grooves, a carriage slidably mounted within said channel member, a track member insertable within said carriage and slidable relative to said carriage and said channel member, said track member having longitudinal ball track grooves on the upper and lower surfaces thereof, and which are aligned with said ball-race grooves, said carriage having longitudi-*

*nal portions between which said track member is located, said carriage portion having ball receiving perforations therethrough, balls rotatably disposed between respective pairs of said ball-race grooves and ball-track grooves, said balls being rotatably disposed within the perforations of said carriage and abutting said ball-race grooves and said ball-track grooves, spring means on one of said carriage portions located between the perforations thereof, and means for anchoring a portion of said spring means to said carriage portion, another portion of said spring means resiliently bearing against one of said members.*

NATHAN A. GUSSACK.

REFERENCES CITED

The following references are of record in the file of this patent or the original patent:

UNITED STATES PATENTS

| Number | Name | Date |
|---|---|---|
| 954,933 | Cossey | Apr. 12, 1910 |
| 1,005,055 | Miller | Oct. 3, 1911 |
| 1,045,523 | Cossey | Nov. 26, 1912 |
| 2,003,549 | Miller | June 4, 1935 |